(12) United States Patent
Hayakawa et al.

(10) Patent No.: US 6,816,444 B1
(45) Date of Patent: Nov. 9, 2004

(54) METHOD AND APPARATUS FOR DIGITAL INFORMATION PROCESSING

(75) Inventors: Hiroyuki Hayakawa, Yokohama (JP); Tamotsu Ito, Ayase (JP); Atsuhiro Ohno, Kitaura (JP); Akira Okushi, Ohmiya (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 09/645,962

(22) Filed: Aug. 24, 2000

(30) Foreign Application Priority Data

Jan. 7, 2000 (JP) .................................. 2000-005864

(51) Int. Cl.[7] ............................................. G11B 5/09
(52) U.S. Cl. ..................... 369/47.2; 369/47.12; 369/84; 369/124.06
(58) Field of Search ..................... 369/47.12, 47.2, 369/47.21, 84, 85, 124.06; 704/500

(56) References Cited

U.S. PATENT DOCUMENTS 6,389,399 B1 * 5/2002 Yasuda ....................... 704/500

FOREIGN PATENT DOCUMENTS

| JP | 10-084178 | 9/1998 |
| JP | 09-351785 | 7/1999 |

* cited by examiner

*Primary Examiner*—Paul W. Huber
(74) *Attorney, Agent, or Firm*—Townsend and Townsend and Crew LLP

(57) ABSTRACT

A content access method and apparatus includes decompressing an input stream read from a storage medium to produce an output signal. The output signal is then multiplexed with timing information different from the timing information contained in the input stream.

13 Claims, 8 Drawing Sheets

METHOD AND APPARATUS FOR DIGITAL INFORMATION PROCESSING

CROSS-REFERENCES TO RELATED APPLICATIONS

The present application is related to and claims priority from Japanese Patent Application No. 2000-005864, filed on Jan. 7, 2000.

BACKGROUND OF THE INVENTION

The present invention relates to digital information processing technology for replicating digital data reproduced from an optical disk onto another optical disk, and particularly to digital information processing technology for expanding compressed sound information, such as the sound of DVD (Digital Versatile Disk) videos, the sound of video CDs, and MP3 (MPEG Audio Layer III) files, and recording the expanded sound information onto CD-R (Compact Disc Recordable) without compressing it.

A technology which relates to an apparatus for dubbing using digital signals in a compressed state is described in Japanese Patent Laid-Open No. Hei 11-185402 and Japanese Patent Laid-Open No. Hei 10-261265, for example.

The above conventional technology is described as a technology for reproducing compressed sound information from a recoding medium and replicating the information onto a MD or the like as it is. However, in the conventional technology, no consideration is given to a means for expanding compressed sound information, such as the sound of DVD videos, the sound of video CDs, and MP3 files, and recording the expanded information onto CD-R without compressing it, as well as a method for generating time information necessary for CD-R reproduction.

An object of the present invention is to provide digital information processing technology for expanding compressed sound information, such as the sound of DVD videos, the sound of video CDs, and MP3 files, and recording (replicating) the expanded information onto CD-R or the like without compressing it.

An object of the present invention is to provide digital information processing technology that allows compressed audio information, such as the sound of a DVD video, the sound of a video CD, or an MP3 file, to be expanded and recorded (replicated) onto a CD-R or the like without compressing it.

SUMMARY OF THE INVENTION

A means for achieving the above object reproduces compressed information from a recording medium, expands the reproduced compressed information, extracts first time information contained in the compressed information, generates second time information by using the first time information and the sample volume of the expanded information, multiplexes the expanded information and the second time information, and records the multiplexed information onto a recording medium other than the above recording medium.

Disclosed herein is a digital information processing method comprising the steps of: reproducing compressed information from a recording medium; expanding the reproduced compressed information; extracting first time information included in the compressed information; generating second time information by using the first time information and the sample volume of the expanded information; multiplexing the expanded information and the second time information; and recording the multiplexed information onto a recording medium other than the recording medium.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

Figure 1:
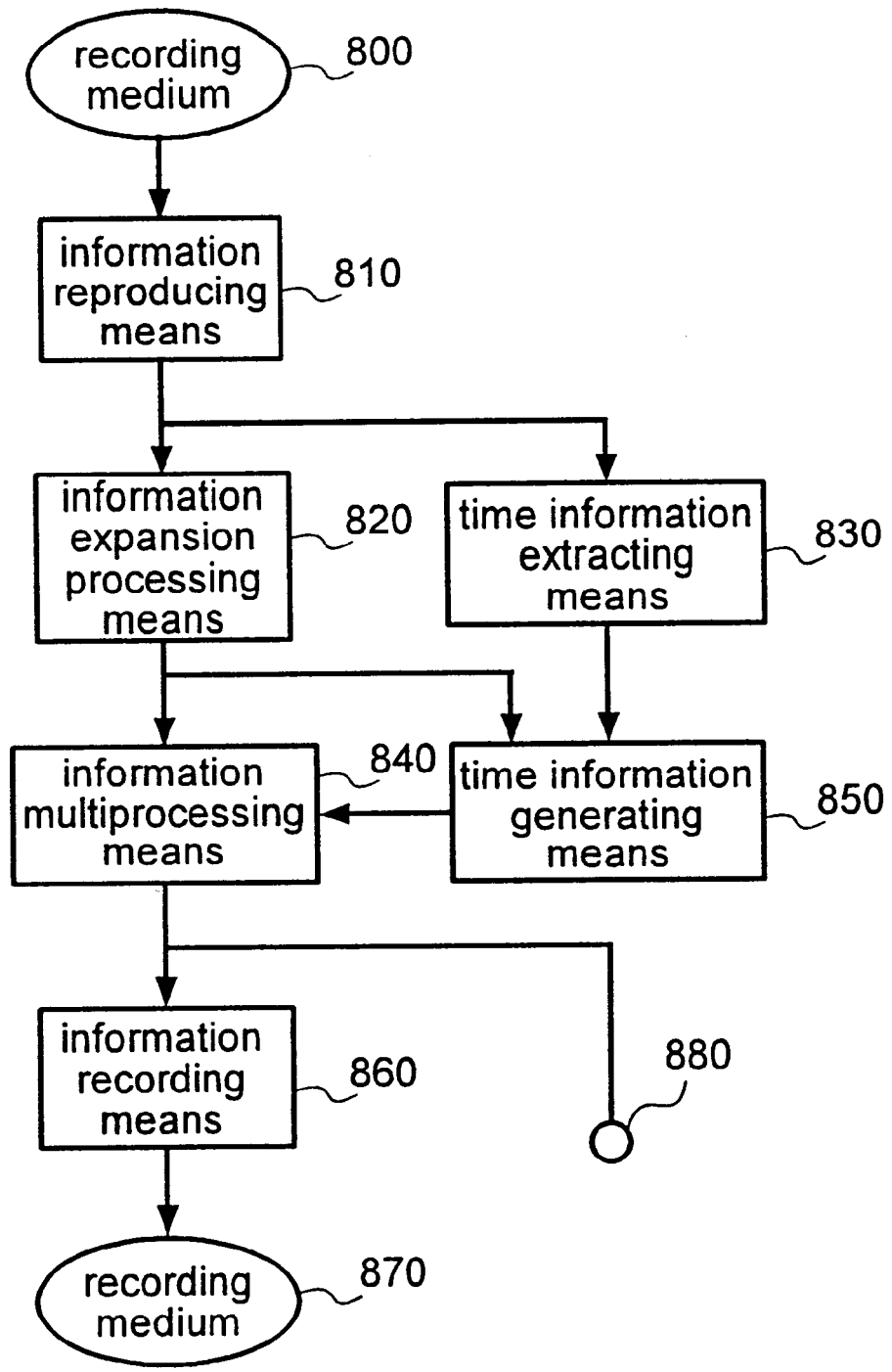
FIG. 1 is a block diagram of a digital information processing apparatus, showing the configuration necessary in order to realize the present invention.
Figure 2:
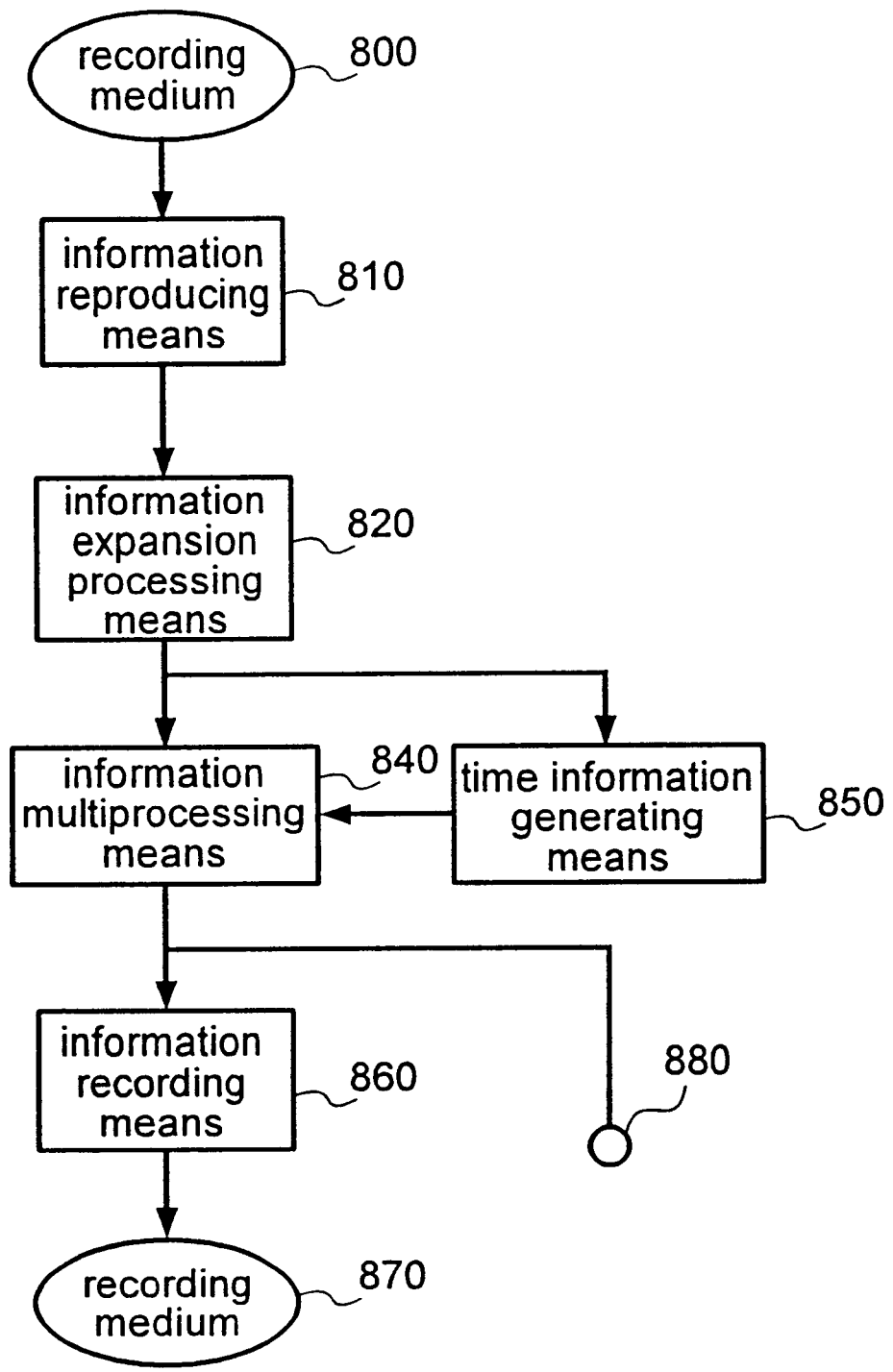
FIG. 2 is a block diagram of a digital information processing apparatus, showing the configuration necessary in order to realize the present invention.
Figure 3:
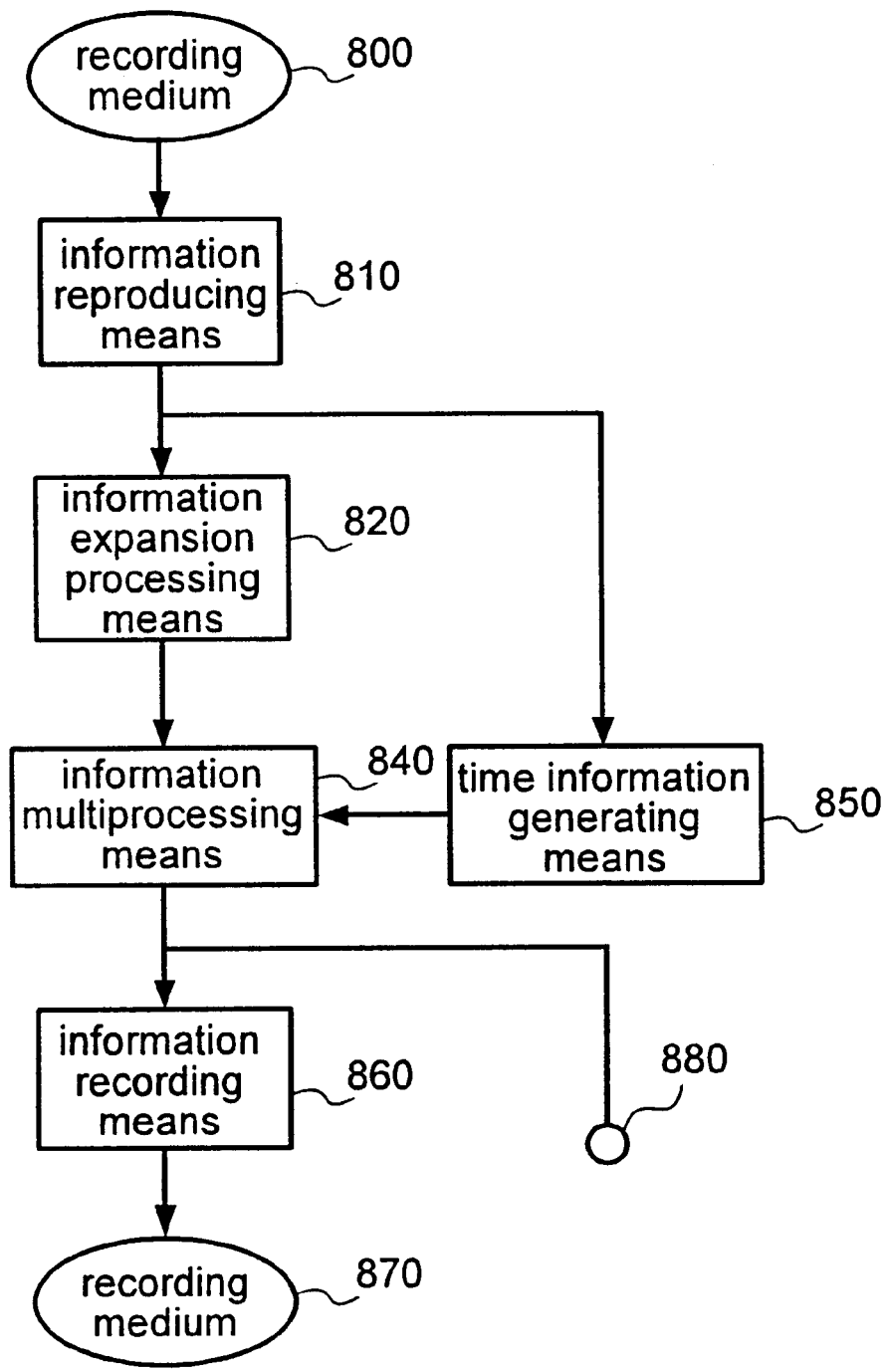
FIG. 3 is a block diagram of a digital information processing apparatus, showing the configuration necessary in order to realize the present invention.

An embodiment of the present invention will be described with reference to FIG. 1. FIGS. 1, 2, and 3 are block diagrams of embodiments of digital information processing apparatus according to the present invention, showing the configurations necessary in order to realize the present invention.

FIG. 1 is a block diagram of digital information processing apparatus, showing the configuration necessary in order to realize the present invention when time information required for expansion processing is multiplexed in the compressed information read from a recording medium 800.

First, an information reproducing means 810 reads compressed information from the recording medium 800. In this compressed information, the compressed information itself and time information required for expansion processing are multiplexed. An information expansion processing means 820 expands the compressed information inputted from the information reproducing means 810.

In the meantime, a time information generating means 850 extracts multiplexed time information from the compressed information inputted from the information reproducing means 810.

Then the time information generating means 850 generates second time information by using the sample volume of the information expanded by the information expansion processing means 820 for interpolation based on the time information inputted into the time information generating means 850, for example. Furthermore, an information multiprocessing means 840 multiplexes and outputs the information expanded by the information expansion processing means 820 and the second time information generated by the time information generating means 850.

Next, an information recording means 860 records the information inputted from the information multiprocessing means 840 onto a recording medium 870. In this case, the recording medium 800 for reproduction and the recording medium 870 for recording may be separately disposed; however, the recording medium 800 for reproduction and the recording medium 870 for recording may also be formed by the same recording medium.

In addition, the information outputted by the information multiprocessing means 840 can also be transmitted to other apparatus by outputting the information via an information output means 880.

FIG. 1 exemplifies an digital information processing apparatus with an information recording means 860 which has the function of recording information onto a recording medium 870 and the function of outputting information by means of an information output means 880. However, the digital information processing apparatus can also be configured as the one which does not have an information output means 880 but has an information recording means 860 to perform only the function of recording information onto a recording medium 870, or configured as the one which does not have an information recording means 860 but has only the function of outputting information by means of an information output means 880.

FIG. 2 is a block diagram of digital information processing apparatus, showing the configuration necessary in order to realize the present invention when time information required for expansion processing is not multiplexed in the compressed information read from a recording medium 800.

An information reproducing means 810 reads compressed information from the recording medium 800. The compressed information consists only of the compressed information. An information expansion processing means 820 expands and outputs the compressed information.

In the meantime, a time information generating means 850 generates and outputs time information after measuring the sample volume of the information expanded by the information expansion processing means 820.

Then an information multiprocessing means 840 multiplexes and outputs the information expanded by the information expansion processing means 820 and the time information generated by the time information generating means 850.

Next, an information recording means 860 records the information inputted from the information multiprocessing means 840 onto a recording medium 870. In this case, the recording medium 800 for reproduction and the recording medium 870 for recording may be separately disposed; however, the recording medium 800 for reproduction and the recording medium 870 for recording may also be formed by the same recording medium.

In addition, the information outputted by the information multiprocessing means 840 can also be transmitted to other apparatus by outputting the information via an information output means 880.

FIG. 2 exemplifies an digital information processing apparatus with an information recording means 860 which has the function of recording information onto a recording medium 870 and the function of outputting information by means of an information output means 880. However, the digital information processing apparatus can also be configured as the one which does not have an information output means 880 but has an information recording means 860 to perform only the function of recording information onto a recording medium 870, or configured as the one which does not have an information recording means 860 but has only the function of outputting information by means of an information output means 880.

FIG. 3 is a block diagram of digital information processing apparatus, showing the configuration necessary in order to realize the present invention when time information is generated by using the information-decoding unit volume of the compressed information reproduced by an information reproducing means 810.

An information reproducing means 810 reads compressed information from a recording medium 800. The compressed information consists only of the compressed information. An information expansion processing means 820 expands and outputs the compressed information.

In the meantime, a time information generating means 850 generates and outputs time information after measuring the information-decoding unit volume of the compressed information reproduced by the information reproducing means 810.

Here, the sample volume per unit of information decoding after expansion processing can be determined by analyzing part of the compressed information, so that time information can be generated by measuring the information-decoding unit volume of the compressed information.

Then an information multiprocessing means 840 multiplexes and outputs the information expanded by the information expansion processing means 820 and the time information generated by the time information generating means 850.

Next, an information recording means 860 records the information inputted from the information multiprocessing means 840 onto a recording medium 870. In this case, the recording medium 800 for reproduction and the recording medium 870 for recording may be separately disposed; however, the recording medium 800 for reproduction and the recording medium 870 for recording may also be formed by the same recording medium.

In addition, the information outputted by the information multiprocessing means 840 can also be transmitted to other apparatus by outputting the information via an information output means 880.

FIG. 3 exemplifies an digital information processing apparatus with an information recording means 860 which has the function of recording information onto a recording medium 870 and the function of outputting information by means of an information output means 880. However, the digital information processing apparatus can also be configured as the one which does not have an information output means 880 but has an information recording means 860 to perform only the function of recording information onto a recording medium 870, or configured as the one which does not have an information recording means 860 but has only the function of outputting information by means of an information output means 880.

Next, an application of the present invention to a DVD video player with a built-in CD-R drive will be described.

Figure 4:
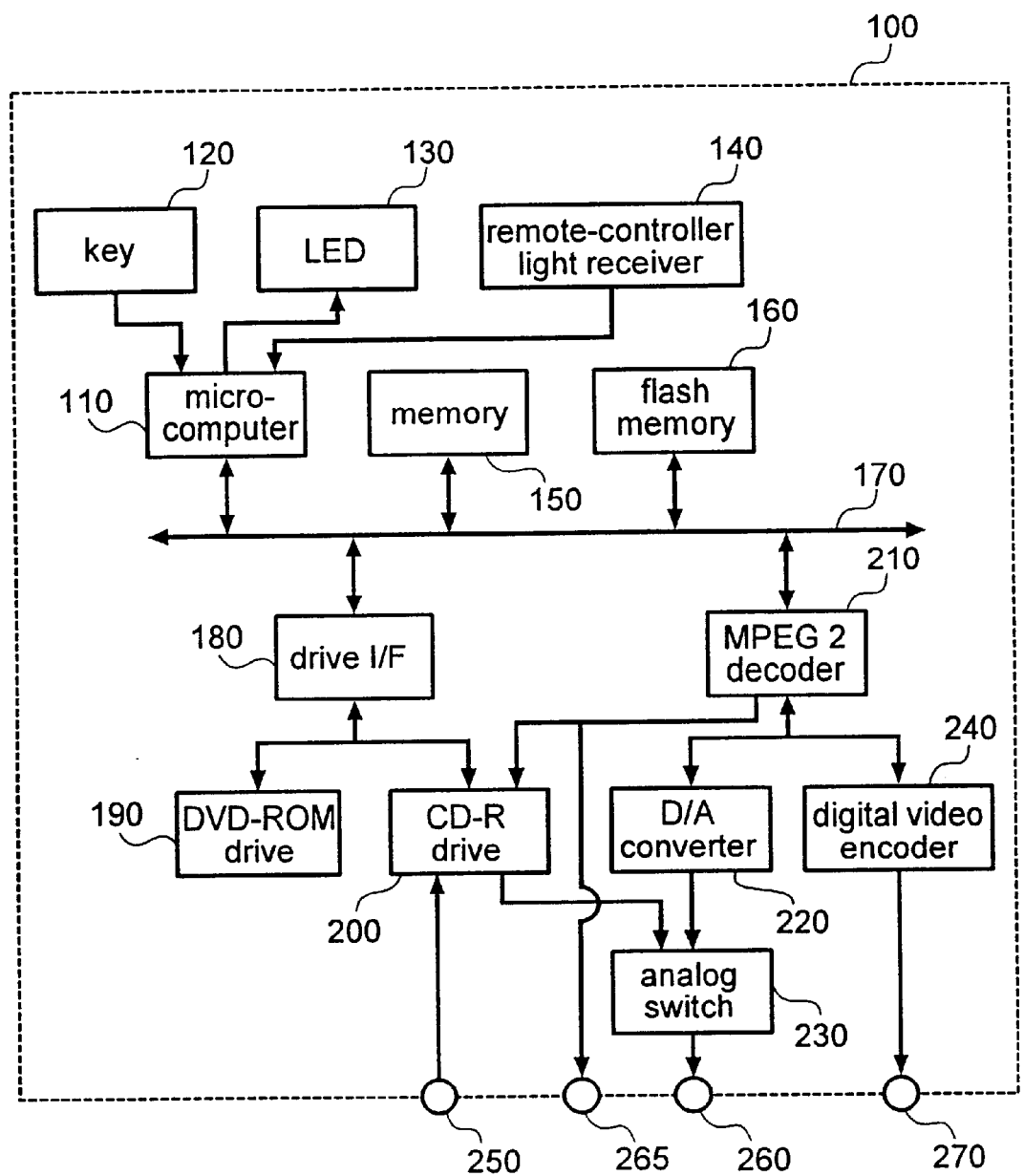
FIG. 4 is a diagram showing the internal configuration of a DVD video player with a built-in CD-R drive.

FIG. 4 shows the internal configuration of a DVD video player with a built-in CD-R drive.

The recording medium 800 shown in FIGS. 1, 2, and 3 corresponds to a optical disk that can be reproduced by a DVD-ROM drive 190; the information reproducing means 810 corresponds to a DVD-ROM drive 190; the information expansion processing means 820 and the time information extracting means 830 correspond to an MPEG2 decoder 210; the information multiprocessing means 840 and the time information generating means 850 correspond to a microcomputer 110; the information recording means 860 corresponds to a CD-R drive 200; and the information output means 880 corresponds to a digital audio output terminal 265.

The basic operation of a DVD video player with a built-in CD-R drive 100 will now be described with reference to FIG. 4.

A DVD video player with a built-in CD-R drive 100 incorporates two drives, that is, a DVD-ROM drive and a CD-R drive. The DVD-ROM drive 190 can reproduce optical disks such as DVD videos, video CDs, CDs, CD-Rs, CD-RWs (Compact Discs ReWritable), for example. On the other hand, the CD-R drive 200 can perform recording onto optical disks such as CD-Rs and CD-RWs, as well as the reproduction of optical disks such as CDs, CD-Rs, and CD-RWs.

First the operation of DVD video reproduction by a DVD-ROM drive 190 will be described.

A microcomputer 110 executes a program stored in a flash memory 160. Then the microcomputer 110 uses a memory 150 as a working memory. The memory 150 is used as a variety of buffers as well as a memory for the microcomputer 110 to execute a program.

The microcomputer 110 detects by means of a key 120 or a remote-controller light receiver 140 that a tray-close button for the DVD-ROM drive 190 is pressed by the user. Or the microcomputer 110 detects via a drive I/F 180 that the tray of the DVD-ROM drive 190 is pushed. Then the DVD-ROM drive 190 identifies the type of disk inserted, and sends the information to the microcomputer 110 via the drive I/F 180.

If the optical disk inserted into the DVD-ROM drive 190 is identified as a DVD video disk, mutual certification between the DVD-ROM drive 190 and the DVD video disk is first performed to check for validity. Then the microcomputer 110 reads the data of the DVD video disk from the DVD-ROM drive 190 while controlling the drive I/F 180. In the meantime, the drive I/F 180 extracts the program stream of the DVD video from the reproduced data, and performs DMA (Direct Memory Access) transfer of the program stream via a system bus 170 to a stream buffer for reproduction provided on the memory 150.

The microcomputer 110 monitors the volume of the program stream accumulated in the stream buffer for reproduction provided on the memory 150, and meanwhile transfers the program stream being accumulated to an MPEG2 decoder 210 as requested by the MPEG2 decoder 210.

The MPEG2 decoder 210 analyzes the header information of the inputted program stream as well as performing decoding, and extracts the compressed video data and audio data to transfer them to a video signal expanding circuit and an audio signal expanding circuit within the MPEG2 decoder 210.

The video signal expanding circuit within the MPEG2 decoder 210 expands the compressed video data. Similarly, the audio signal expanding circuit within the MPEG2 decoder 210 expands the compressed audio data to transfer it to a D/A converter 220.

In the program stream of the DVD video analyzed by the MPEG2 decoder 210, time information, that is, PTS (Presentation Time Stamp) and DTS (Decoding Time Stamp) is attached to each of the compressed video data and audio data. Based on the time information, the MPEG2 decoder 210 controls the timing of expansion processing by the video signal expanding circuit and the audio signal expanding circuit to synchronize the video with the audio.

Then the MPEG2 decoder 210 outputs the expanded digital video data to a digital video encoder 240. The digital video encoder 240 outputs the inputted digital video data after converting it in CCIR 656 format, for example, to an analog signal in NTSC format.

Similarly, the MPEG2 decoder 210 outputs the expanded digital audio data to the D/A converter 220. The D/A converter 220 outputs the inputted audio signal after converting it to a two-channel analog signal, for example. An analog switch 230, operated under the control of the microcomputer 110, selects and outputs the input signal from the D/A converter 220. Then, the video signal and the audio signal are outputted via a video output terminal 270 and an audio output terminal 260 respectively to a TV connected with the DVD video player with a built-in CD-R drive 100, for example.

Next the reproducing operation of a CD, CD-R, or CD-RW by a DVD-ROM drive 190 and a CD-R drive 200 will be described.

First a DVD-ROM drive 190 or a CD-R drive 200 identifies the type of disk inserted, and sends the information to a microcomputer 110 via a drive I/F 180.

When a CD, CD-R, or CD-RW disk is inserted into the DVD-ROM drive 190 or the CD-R drive 200, the microcomputer 110 controls the drive I/F 180 to obtain information on the type of optical disk inserted into the DVD-ROM drive 190 or the CD-R drive 200. Then the microcomputer 110 reads the data of the CD, CD-R, or CD-RW disk, while the drive I/F 180 extracts digital audio data from the reproduced data to perform DMA transfer of the data via a system bus 170 to a stream buffer for reproduction provided on a memory 150.

The microcomputer 110 monitors the volume of the digital audio data accumulated in the stream buffer for reproduction provided on the memory 150, and meanwhile transfers the digital audio data being accumulated to an MPEG2 decoder 210 as requested by the MPEG2 decoder 210.

The digital audio data inputted into the MPEG2 decoder 210 is not compressed. Therefore, the MPEG2 decoder 210 detects the data and transfers it to a D/A converter 220 as it is without performing any processing. The data can also be outputted to the outside of the apparatus via a digital audio output terminal 265.

The D/A converter 220 outputs the inputted digital audio data after converting it to a two-channel analog signal, for example. An analog switch 230, operated under the control of the microcomputer 110, selects and outputs the output signal from the D/A converter 220. Then, the audio signal is outputted via an audio output terminal 260 to a TV or a stereo set connected with the DVD video player with a built-in CD-R drive 100, for example.

Next the recording operation of a CD, CD-R, or CD-RW by a CD-R drive 200 will be described. Methods for recording onto the CD-R drive 200 include, for example, a method in which an analog audio signal or a digital audio data is inputted directly from an audio input terminal 250, and a method in which the data of a CD, CD-R, or CD-RW disk reproduced by a DVD-ROM drive 190 is recorded via a drive I/F 180, a system bus 170, a stream buffer for reproduction provided on a memory 150, and an MPEG2 decoder 210.

Next the operation for recording an MP3 file reproduced by a DVD-ROM drive 190 onto a CD-R or CD-RW will be described with reference to FIGS. 5, 6, and 7.

Figure 5:
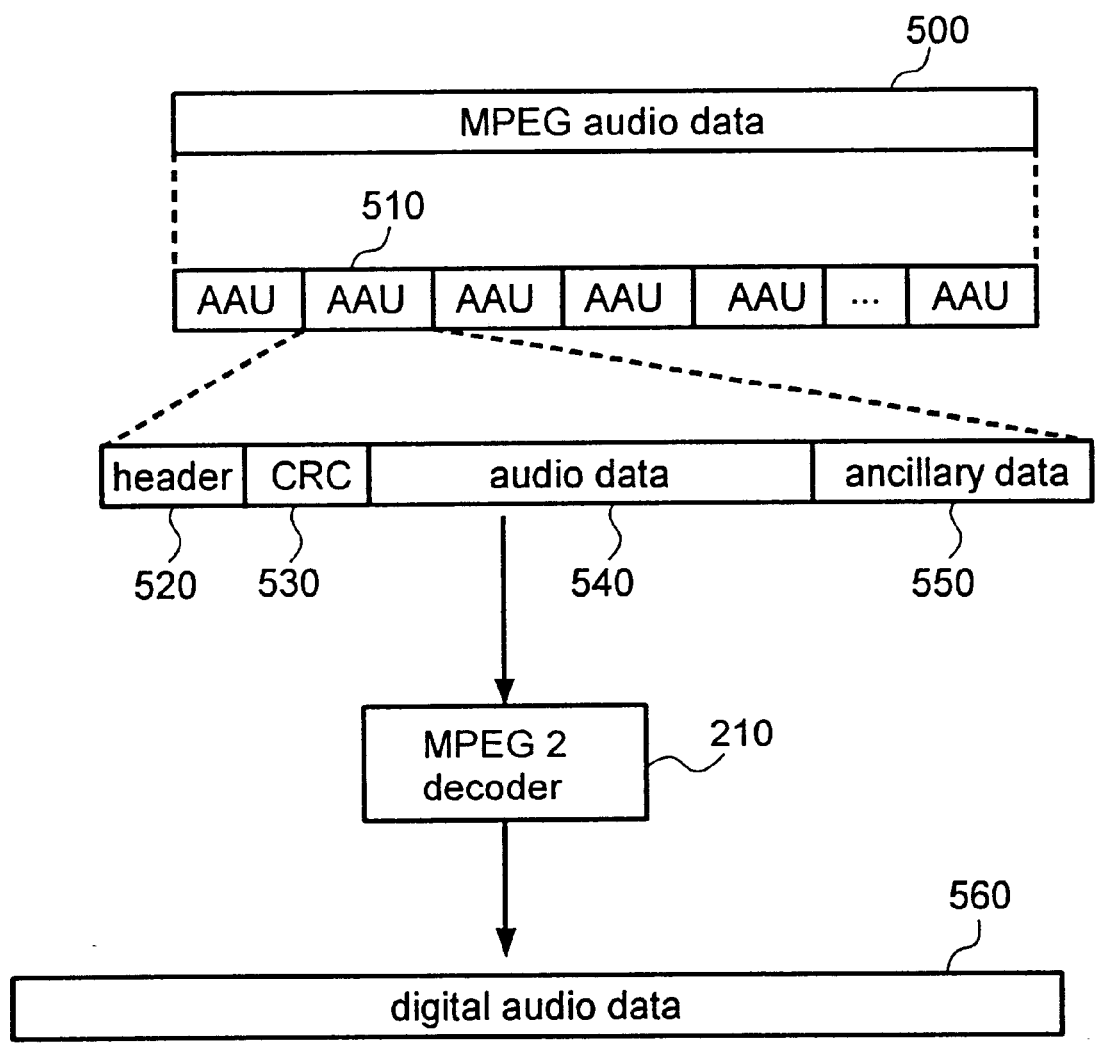
FIG. 5 is a diagram showing the data composition of an MP3 file and the operation of expansion processing.

FIG. 5 shows the data composition of an MP3 file and the operation of expansion processing. In the figure, there are provided an MPEG2 decoder 210, which is shown in FIG.

4, MPEG audio data 500 (elementary stream), an AAU 510 (Audio Access Unit), a header 520, a CRC 530 (Cyclic Redundancy Check), audio data 540, ancillary data 550, and extended digital audio data 560.

Generally, in a CD-ROM (Compact Disc Read Only Memory) wherein a large number of MP3 files are recorded, a PES (Packetized Elementary Stream) header that retains time information such as PTS is not attached, as shown in FIG. 5. Instead, the files are recorded, for example, in the form of MPEG audio data 500 comprising a plurality of AAUs 510, that is, in the form of an elementary stream.

Furthermore, each AAU 510 comprises a header 520, an optional CRC 530, audio data 540, and ancillary data 550, which is inserted so as to maintain the AAU 510 at a fixed length.

A DVD-ROM drive 190 identifies the type of optical disk inserted, and sends the information to a microcomputer 110 via a drive I/F 180.

When the disk inserted into the DVD-ROM drive 190 is identified as a CD-ROM with MP3 files recorded, the DVD-ROM drive 190 reads the data of the CDROM disk, while the drive I/F 180 extracts MPEG audio data 500 from the reproduced data to perform DMA transfer of the data via a system bus 170 to a stream buffer for reproduction provided on a memory 150.

The microcomputer 110 monitors the volume of the MPEG audio data 500 accumulated in the stream buffer for reproduction provided on the memory 150, and meanwhile transfers the MPEG audio data 500 being accumulated to an MPEG2 decoder 210 as requested by the MPEG2 decoder 210.

The MPEG audio data 500 inputted into the MPEG2 decoder 210 is extended for each AAU 510 unit by an audio signal expanding circuit within the MPEG2 decoder 210 to be transferred to a D/A converter 220.

The D/A converter 220 outputs the inputted digital audio data 560 after converting it to a two-channel analog signal, for example. An analog switch 230, operated under the control of the microcomputer 110, selects and outputs the output signal from the D/A converter 220. Then, the audio signal is outputted via an audio output terminal 260 to a TV or a stereo set connected with the DVD video player with a built-in CD-R drive 100, for example.

In the meantime, the microcomputer 110 draws up the extended digital audio data 560 from the MPEG2 decoder 210 to a stream buffer for recording provided on the memory 150 via the system bus 170.

Figure 6:
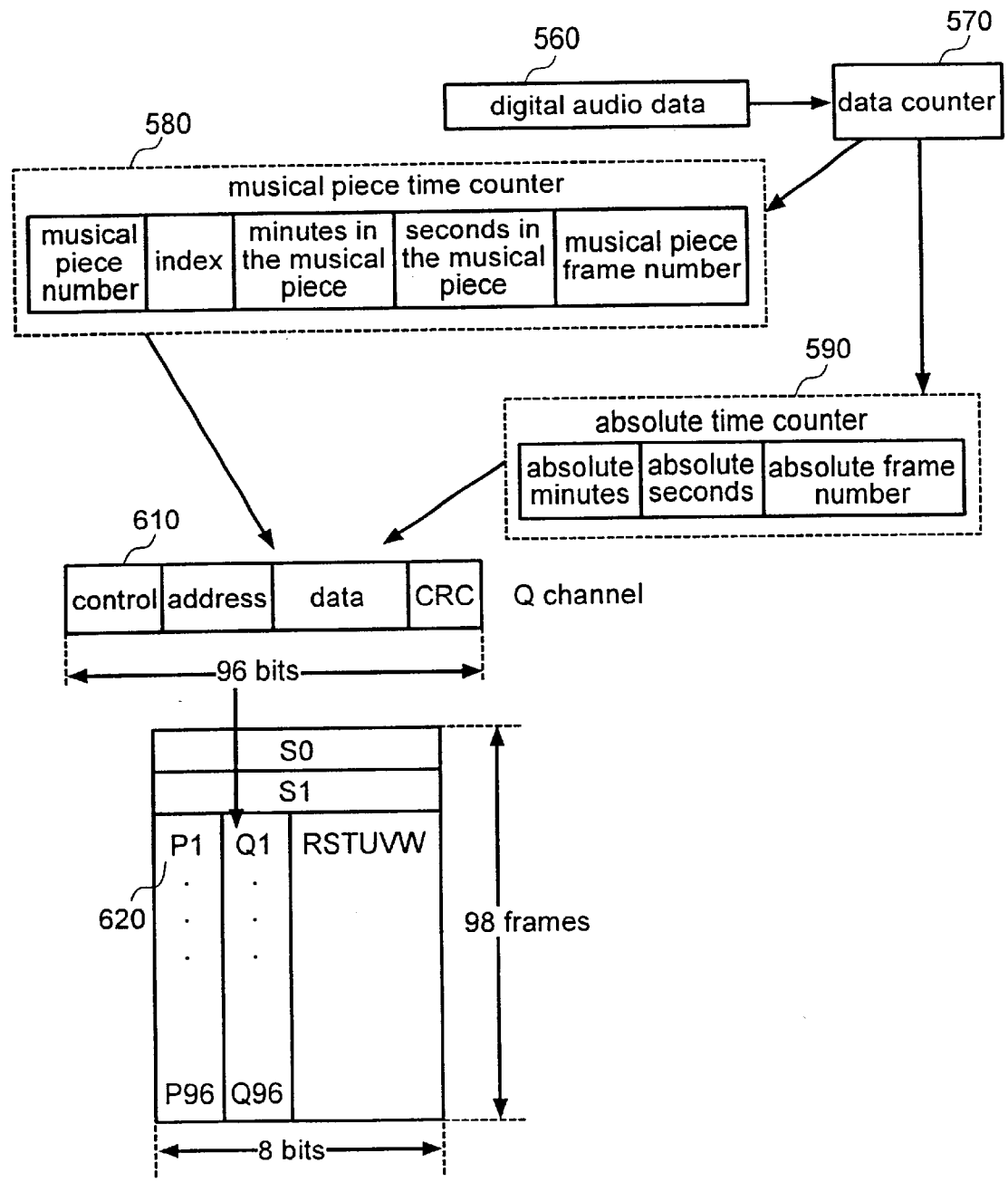
FIG. 6 is a diagram showing the processing for generating information required for recording onto a CD-R.

FIG. 6 shows the processing for generating the information required for recording onto a CD-R. In the figure, there are provided digital audio data 560, which is shown in FIG. 5, a data counter 570, a musical piece time counter 580, an absolute time counter 590, a Q channel 610, and a sub-code 620.

Figure 7:
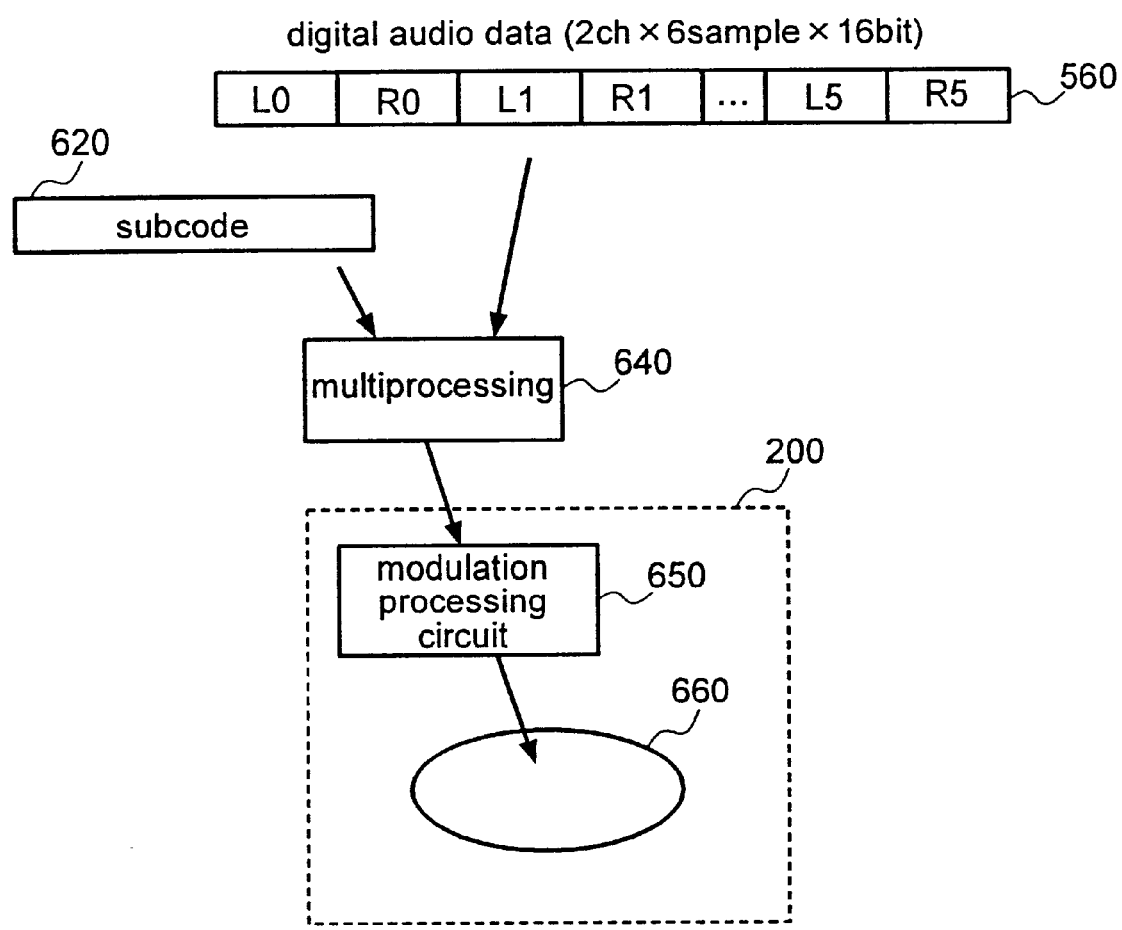
FIG. 7 is a diagram showing the processing for multiplexing information required for recording onto a CD-R.

FIG. 7 shows the processing for multiplexing the information required for recording onto a CD-R. In FIG. 7, there are provided a CD-R drive 200, which is shown in FIG. 4, digital audio data 560, which is shown in FIG. 5, a sub-code 620, which is shown in FIG. 6, a multiprocessing section 640, a modulation processing circuit 650, and a CD-R disk 660.

A microcomputer 110 reads digital audio data 560 accumulated in a stream buffer for recording provided on a memory 150, while a data counter 570 provided on the memory 150 counts the sample count of the digital audio data 560. Accordingly, the microcomputer 110 increases the figures in a musical piece time counter 580 and an absolute time counter 590 provided on the memory 150.

The musical piece time counter 580 retains a musical piece number, an index, minutes in the musical piece, seconds in the musical piece, and a musical piece frame number, and increases these figures in sync with the increase in the count of the data counter 570. Also the absolute time counter 590 retains absolute minutes, absolute seconds, and an absolute frame number, and similarly increases these figures in sync with the increase in the count of the data counter 570.

In the case of a CD-R disk, which is pre-formatted, the initial value of the absolute time counter 590 is automatically determined when the recording start position is determined.

In the meantime, the microcomputer 110 sequentially reads the figures in the musical piece time counter 580 and the absolute time counter 590, and multiplexes the figures in the musical piece time counter 580 and the absolute time counter 590 to create a Q channel 610 consisting of 96 bits. Then the microcomputer 110 vertically arranges the Q channel 610 including time information to form a sub-code 620 consisting of 98 frames×8 bits in combination with other information.

Then the microcomputer 110 reads the formed sub-code 620 and the digital audio data 560 for six samples, which corresponds to the sub-code 620, from a stream buffer for recording, and multiplexes the sub-code 620 and the digital audio data 560 by means of a multiprocessing section 640 provided on the memory 150 to write them to a CD-R drive 200. The CD-R drive 200 modulates the data by means of a modulation processing circuit 650 within the CD-R drive 200 and records the data onto a CD-R disk 660.

In the above case, the data counter 570 counts the sample count in the expanded digital audio data 560; however, the number of AAUs 510 before expansion processing may also be used.

This is because the sample count in the digital audio data 560 after expansion processing can be calculated from the bit rate and the sampling frequency included in the header 520 of an AAU 510. The microcomputer 110 detects the number of AAUs 510 to be expanded from an MPEG2 decoder 210, and sets the figures calculated from the number of AAUs 510 for the self-running data counter 570.

The recording operation by a CD-R drive 200 of optical disks such as CDs, CD-Rs, CD-RWs will be described in addition. Methods for input to the CD-R drive 200 include, for example, a method in which an analog audio signal or a digital audio signal is inputted directly from an audio input terminal 250, and a method in which the data of a CD, CD-R, or CD-RW disk reproduced by a DVD-ROM drive 190 is inputted via a drive I/F 180, a system bus 170, a stream buffer for reproduction provided on a memory 150, and an MPEG2 decoder 210.

The above description has dealt with recording processes in which time information is not included in the compressed data to be replicated. Next, the description below will deal with cases in which time information is included in the recorded compressed data, such as a case in which the sound of a DVD video is expanded and recorded onto a CD-R or CD-RW disk.

Figure 8:
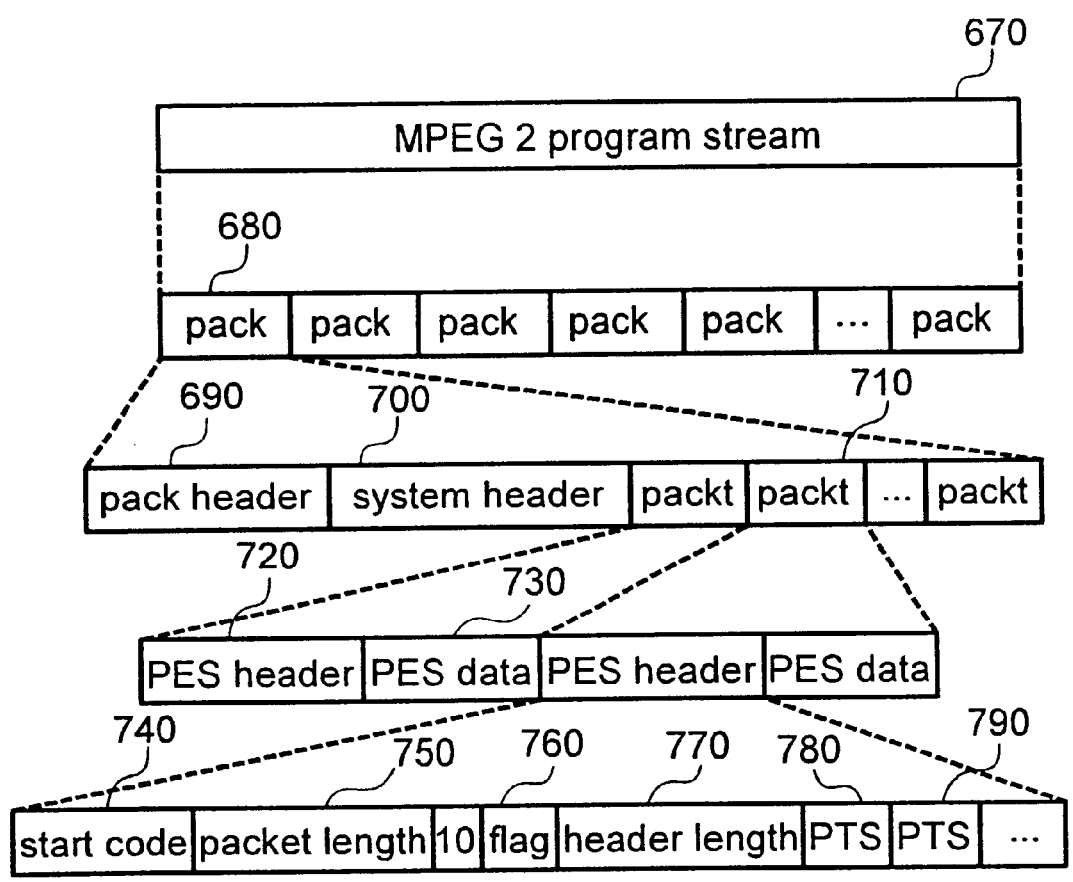
FIG. 8 is a diagram showing the composition of the program stream of a DVD video.

FIG. 8 shows the composition of the program stream of a DVD video. In FIG. 8, there are provided an MPEG2 program stream 670, a pack 680, a pack header 690, a system header 700, a packet 710, a PES header 720, PES data 730, a start code 740, a packet length 750, a flag 760, a header length 770, a PTS 780, and a DTS 790.

As shown in FIG. 8, an MPEG2 program stream 670 consists of a plurality of packs 680, and each pack 680 consists of a pack header 690, a system header 700, and a plurality of packets 710. Each of the packets 710 further consists of a PES header 720 and PES data 730, with a PTS 780 and a DTS 790, which are time information, included in the PES header 720. However, the presence or absence of a PTS 780 and a DTS 790 is described in a flag 760 and when the packet 710 is an audio packet, only a PTS 780 is included and a DTS 790 is not present.

First a microcomputer 110 controls a drive I/F 180 to obtain the information on the type of optical disk inserted into a DVD-ROM drive 190. Then, if the optical disk inserted into the DVD-ROM drive 190 is identified as a DVD video disk, mutual certification between the DVD-ROM drive 190 and the DVD video disk is performed to check for validity.

Then the microcomputer 110 reads the data of the DVD video disk from the DVD-ROM drive 190 while controlling the drive I/F 180. In the meantime, the drive I/F 180 extracts the MPEG2 program stream 670 of the DVD video from the reproduced data, and performs DMA transfer of the program stream via a system bus 170 to a stream buffer for reproduction provided on a memory 150.

The microcomputer 110 monitors the volume of the program stream accumulated in the stream buffer for reproduction provided on the memory 150, and meanwhile transfers the MPEG2 program stream 670 being accumulated to an MPEG2 decoder 210 as requested by the MPEG2 decoder 210.

The MPEG2 decoder 210 analyzes the header information of the inputted MPEG2 program stream 670 as well as performing decoding, and extracts the compressed digital video data and digital audio data to transfer them to a video signal expanding circuit and an audio signal expanding circuit within the MPEG2 decoder 210.

Furthermore, the microcomputer 110 draws up the expanded digital audio data 560 to a stream buffer for recording provided on the memory 150 via the system bus 170. In the meantime, the microcomputer 110 checks the flag 760 to detect a PTS 780, which is then drawn up simultaneously with the digital audio data 560 and put in a buffer provided for PTS 780 on the memory 150.

The microcomputer 110 calculates the figures to be set for a data counter 570, based on the PTS 780 accumulated in the buffer for PTS 780 provided on the memory 150. Also, the figures are interpolated by using the number of AAUs 510 contained in PES data 730, and are set in the data counter 570. In sync with the self-running data counter 570, the microcomputer 110 increases the figures in a musical piece time counter 580 and an absolute time counter 590 provided on the memory 150.

Next, the microcomputer 110 sequentially reads the figures in the musical piece time counter 580 and the absolute time counter 590, and multiplexes the figures in the musical piece time counter 580 and the absolute time counter 590 to create a Q channel 610 consisting of 96 bits. Then the microcomputer 110 vertically arranges the Q channel 610 including time information to form a sub-code 620 consisting of 98 frames×8 bits in combination with other information.

Then the microcomputer 110 reads the formed sub-code 620 and the digital audio data 560 for six samples, which corresponds to the sub-code 620, from the stream buffer for recording, and multiplexes the sub-code 620 and the digital audio data 560 by means of a multiprocessing section 640 provided on the memory 150 to write them to a CD-R drive 200 via the drive I/F 180. The CD-R drive 200 modulates the data by means of a modulation processing circuit 650 within the CD-R drive 200 and records the data onto a CD-R disk 660.

In the embodiment described above, a CD-R is used as an example of a recording medium onto which to record data. However, the embodiment can also be realized by using other recording media, such as a DVD-RAM (Digital Versatile Disk Random Access Memory), a DVD-R (Digital Versatile Disk Recordable), a DVD-RW (Digital Versatile Disc ReWritable), a hard disk, or a flash memory.

Examples of the drive I/F 180 described in the present embodiment include an ATAPI (AT Attachment with Packet Interface), a SCSI (Small Computer System Interface), a USB (Universal Serial Bus), and IEEE1394.

In the embodiment described above, a DVD-ROM drive is used for reproduction and a CD-R drive is used for recording by way of example. However, a DVD-RAM drive, a DVD-R drive, a DVD-RW drive, a hard disk, or a flash memory, for example, can also be used for reproduction.

The embodiment shown in FIG. 4 described a case in which a CD-R drive for recording and a digital audio output terminal 265 are provided. However, it is possible to configure a DVD video player with a built-in CD-R drive which does not have a digital audio output terminal 265, or a DVD video player which does not have a CD-R drive for recording but has only a digital audio output terminal 265 to perform recording outside of the apparatus.

The embodiment shown in FIG. 4 makes it possible to provide a means for expanding compressed audio information such as the sound of a DVD video, the sound of a video CD, or an MP3 file and recording the information onto a CD-R without compressing it, and also a method for generating time information necessary for CD-R reproduction. Therefore, the present embodiment can be configured as a DVD video player with a built-in CD-R drive which makes it possible not only to replicate CDs, as a conventional CD recorder does, but also to replicate audio information from a plurality of types of media onto which compressed data is recorded.

Moreover, if a silent section lasting for more than a given period of time is present in a single musical piece, the recording means of a normal CD-R drive automatically detects the silent section and records it as another musical piece. A DVD video player with a built-in CD-R drive according to the present invention, however, allows a single musical piece to be recorded as a single musical piece even if a silent section lasting for more than a given period of time is present in the single musical piece, for example.

According to the present invention, compressed audio information such as the sound of a DVD video, the sound of a video CD, or an MP3 file can be expanded and recorded (replicated) onto a CD-R or the like without compressing it.

What is claimed is:

1. A digital information processing apparatus comprising:
   an information reproducing means for reproducing compressed information from a recording medium;
   an information expansion processing means for expanding compressed information inputted from said information reproducing means;
   a time information extracting means for extracting first time information included in said compressed information;
   a time information generating means for generating second time information based on the first time information inputted from said time information extracting means and based on the sample volume of the information expanded by said information expansion processing means;

an information multiprocessing means for multiplexing the information expanded by said information expansion processing means and the second time information generated by said time information generating means; and an information output means for outputting the information multiplexed by said information multiprocessing means to the outside of the present apparatus.

2. A digital information processing apparatus as claimed in claim 1, further comprising an information recording means for recording the information multiplexed by said information multiprocessing means onto a recording medium other than said recording medium.

3. The apparatus of claim 1 wherein the information output means is an information recording means for recording the information multiplexed by said information multiprocessing means onto a recording medium other than said recording medium.

4. A digital information processing apparatus comprising:

an information reproducing means for reproducing compressed information from a recording medium;

an information expansion processing means for expanding compressed information inputted from said information reproducing means;

a time information generating means for generating time information;

an information multiprocessing means for multiplexing the information expanded by said information expansion processing means and the time information generated by said time information generating means; and an information output means for outputting the information multiplexed by said information multiprocessing means to the outside of the present apparatus.

5. The apparatus of claim 4 wherein the time information generating means produces the time information by using the sample volume of the information expanded by said information expansion processing means.

6. The apparatus of claim 5 further including information recording means for recording the information multiplexed by said information multiprocessing means onto a recording medium other than said recording medium.

7. The apparatus of claim 4 wherein the time information generating means produces the time information by using the information-decoding unit volume of the compressed information reproduced by said information reproducing means.

8. A digital information processing apparatus as claimed in claim 7, wherein the information output means for outputting is an information recording means for recording the multiplexed information inputted from said information multiprocessing means onto a recording medium other than said recording medium.

9. A digital information processing apparatus as claimed in claim 7, further comprising an information recording means for recording the multiplexed information inputted from said information multiprocessing means onto a recording medium other than said recording medium.

10. A digital information processing method comprising the steps of:

reproducing compressed information from a recording medium;

expanding said reproduced compressed information to produce expanded information comprising first timing information and a sample volume;

generating time information based on said first timing information and on said sample volume;

multiplexing said expanded information and said time information to produce multiplexed information; and recording said multiplexed information onto a recording medium other than said recording medium, or outputting said multiplexed information, or both.

11. The method of claim 10 wherein generating time information includes extracting first time information included in said compressed information and generating second time information by using said first time information and the sample volume of said expanded information; wherein multiplexing is a step of multiplexing said expanded information and said second time information.

12. The method of claim 10 wherein generating time information is a step of generating time information by using the sample volume of said expanded information.

13. The method of claim 10 wherein generating time information is a step of generating time information by using the information-decoding unit volume of said reproduced compressed information.

* * * * *